No. 705,245. Patented July 22, 1902.
C. E. HINMAN.
MILK PASTEURIZER AND STERILIZER.
(Application filed Mar. 11, 1901.)
(No Model.)
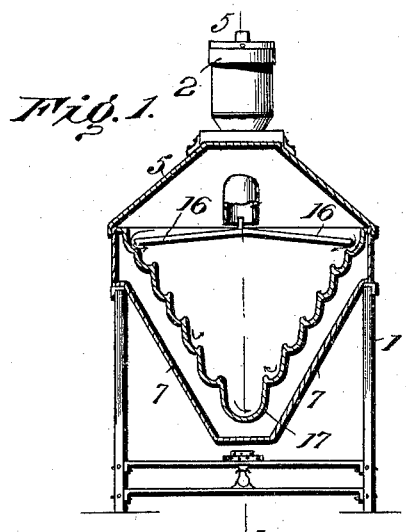
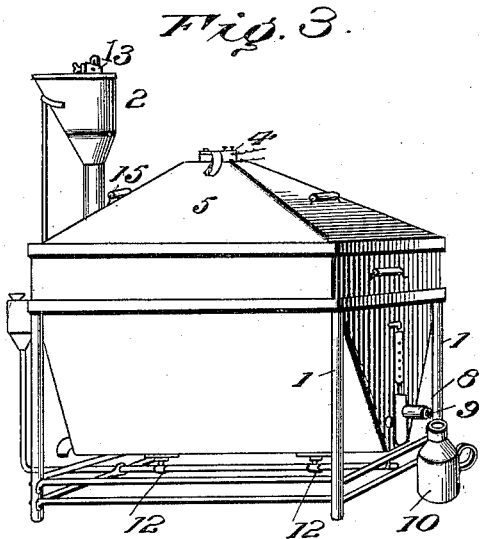
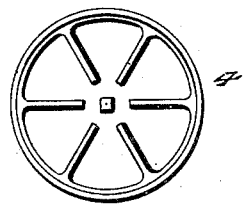
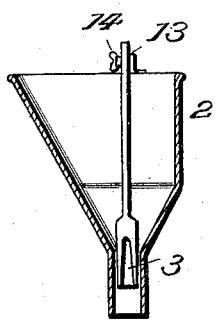
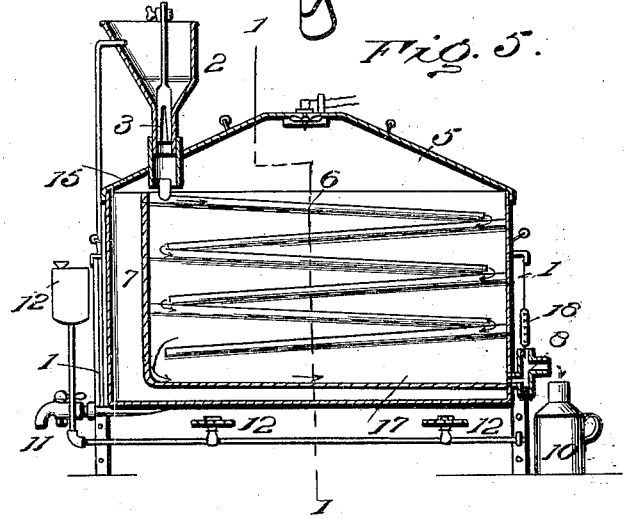
Witnesses
Inventor
Charles E. Hinman,
By Thos. E. Robertson,
Associate Attorney

UNITED STATES PATENT OFFICE.

CHARLES E. HINMAN, OF COUNCIL BLUFFS, IOWA, ASSIGNOR OF ONE-HALF TO WILLIAM C. McPHERSON, OF COUNCIL BLUFFS, IOWA.

MILK PASTEURIZER AND STERILIZER.

SPECIFICATION forming part of Letters Patent No. 705,245, dated July 22, 1902.

Application filed March 11, 1901. Serial No. 50,689. (No model.)

*To all whom it may concern:*

Be it known that I, CHARLES E. HINMAN, a citizen of the United States, residing at Council Bluffs, county of Pottawattamie, and State of Iowa, have invented certain new and useful Improvements in Milk Pasteurizers and Sterilizers; and I do hereby declare the following to be a full, clear, and exact description of the invention, such as will enable others skilled in the art to which it appertains to make and use the same, reference being had to the figures of reference marked thereon, which form a part of this specification.

My invention relates to improvements in milk pasteurizers and sterilizers.

Figure 1 is a vertical section on the line 1 1 of Fig. 5, showing the lower part of the feed-tank broken away to illustrate the means for delivering the milk to the feedways. Fig. 2 is a top view of suction-fan. Fig. 3 is a diagonal side elevation of my device with all parts in place. Fig. 4 is a side view of suction-fan. Fig. 5 is a vertical section on the line 5 5 of Fig. 1, showing position of feed-tank, suction-fan, one course of incline planes, also water-jacket, gasolene-tank burner in place, and water and milk discharges. Fig. 6 shows feed and feed-valve by which quantity of milk is regulated and discharged over a two-way device. Fig. 7 is a cross-section through the valve.

Similar figures of reference refer to corresponding parts.

My invention relates more particularly to that class of pasteurizers and sterilizers which are intended to preserve and purify the milk in its original globule form without agitation in that it merely flows down the corrugated incline planes and is subjected to any desired temperature of the water under and against said corrugated incline planes at the sides and back, and consists of supporting-standard 1, a feed-tank 2, a feed-valve 3, the said valve being a two-way valve, the ports or discharge-ways of which are indicated most clearly in Fig. 6, a suction-fan 4, a metal cover 5, with suction-fan mounted thereon, corrugated metal incline planes 6, metal water-jacket 7 on sides and back of corrugated incline planes, air-vent 8 to permit of the ready escape of the air, a discharge-pipe 9, a receiving milk-can 10, a discharge-cock 11 to empty water-jacket 7, a gasolene-tank, and burners 12.

When all parts of my device are constructed of suitable material, the supporting-standard being constructed of metal pipe or angle-steel, and said corrugated incline planes 6 may be of any desired sheet metal, preferably of tin, and said water-jacket 7 is preferably constructed of galvanized iron, and said feed-tank 2 may be constructed of any desired sheet metal, preferably of tin, and feed-valve 3 may be made of either wood or metal, preferably of tin, the plunger 13 may be raised or lowered as desired and held in place by set-screw 14. The water-jacket 7 is filled by funnel at tube 15.

When all parts are arranged and combined as herein described, the water-jacket 7 is filled with water and the gasolene or other heat is applied, and when the water has reached the boiling-point, as shown by discharge of steam from tube 15, the milk is poured into the feed-tank 2 and plunger 13 is adjusted to discharge-ways of the valve 3, the milk being divided by reason of the oppositely-disposed discharge-ways of the valve 3 and the apex formed by the junction of the oppositely-inclined feedways 16, which, as seen in Fig. 1, may be extended to form a spreader, one half thereof being carried by feedways 16 to the top corrugated incline planes 6 6 to the right and other half to the left. The milk becomes heated as it traverses said corrugated incline planes and emits steam, and the suction-fan is put in motion by any desired power, preferably by chemical battery-motor, and sufficient speed generated, preferably two thousand revolutions per minute, to exhaust the vapor arising from the heated milk, thereby instantly removing all impurities. Said corrugated incline planes are hermetically closed against the ingress of air during the process of treatment. When the milk fed upon each series of corrugated incline planes has reached 17, it passes on corrugated incline plane into air-vent 8 and discharges from pipe 9 into milk-can 10. When the apparatus is at any desired temperature, preferably 140° Fahrenheit, as shown by thermometer 18, the milk is thoroughly pasteurized or sterilized. The original body of the milk is preserved and purified and upon cooling the cream will rise and the milk and cream will remain sweet long after other milk has soured. The suction-fan removes all impurities instantly as they rise.

My device may also be used for cooling milk by filling water-jacket with cold water and feeding the milk to be cooled, as for pasteurizing and sterilizing by heat, or one of my apparatus may be operated for pasteurizing and sterilizing and raised so that a second will receive pasteurized or sterilized milk in feed-tank with cold or ice water in water-jacket and be discharged at any degree of coolness.

My device may be used for sterilizing water, and when so sterilized it may be cooled in manner aforesaid.

What I claim as new, and desire to secure by United States Letters Patent, is—

1. In a pasteurizing and sterilizing apparatus, the combination of a feed-tank, a valve controlling the outlet therefrom, corrugated plates inclined downwardly from their upper ends toward each other to receive the liquid, and means disposed within the upper ends of said plates for dividing the flow of the liquid to distribute it to the inner faces of said plates, substantially as described.

2. In a pasteurizing and sterilizing apparatus, the combination of a feed-tank, a valve controlling the outlet therefrom, corrugated plates inclined downwardly from their upper ends toward each other to receive the liquid, and means disposed within the upper ends of said plates for dividing the flow of the liquid to distribute it to the inner faces of said plates, and a water-jacket within which said plates are disposed and heaters disposed beneath said jacket, substantially as described.

3. In a pasteurizing and sterilizing apparatus, the combination of a tank, a valve controlling the discharge therefrom, corrugated inclined planes, a water-jacket, means for heating the same, a cover and a suction-fan carried thereby, substantially as described.

4. In a pasteurizing and sterilizing apparatus, the combination of a tank, a regulating-valve having oppositely-disposed discharge-ways, oppositely-disposed corrugated inclined planes, inclined downward from their upper ends toward each other with an inclined delivery at the lower end, means interposed between said planes and the valve for dividing the liquid and directing it to opposite sides of said planes, and means for adjusting said valve and holding it in its adjusted position, substantially as described.

5. In a pasteurizing and sterilizing apparatus, the combination of a tank, a regulating-valve having oppositely-disposed discharge-ways, oppositely-disposed corrugated inclined planes, means interposed between said planes and the valve for dividing the liquid and directing it to both of said planes, a cover and a suction-fan carried thereby for removing the impurities arising from the liquid on said inclined planes, substantially as described.

6. In a pasteurizing and sterilizing apparatus, the combination of a receptacle, a water-jacket around the same, inclined corrugated planes, a cover for said receptacle, a suction-fan mounted thereon, a feed-tank and controlling-valve therefor, and an air-vent and discharge-pipe connected with the lowermost portion of said inclined planes, substantially as described.

CHARLES E. HINMAN.

Witnesses:
J. R. McPHERSON,
G. D. CARSON.